United States Patent [19]
>
> Hawrylko

[11] Patent Number: 4,755,538

[45] Date of Patent: Jul. 5, 1988

[54] SKINLESS POROUS PARTICLE PVC RESIN AND PROCESS FOR PRODUCING SAME

[75] Inventor: Roman B. Hawrylko, North Olmsted, Ohio

[73] Assignee: The B. F. Goodrich Company, Akron, Ohio

[21] Appl. No.: 106,836

[22] Filed: Oct. 6, 1987

Related U.S. Application Data

[62] Division of Ser. No. 38,099, Apr. 14, 1987, Pat. No. 4,711,908.

[51] Int. Cl.$^4$ ............................................. C08J 9/28
[52] U.S. Cl. ........................................ 521/56; 521/57; 521/59; 521/145; 526/202; 526/203; 526/344.2; 526/81
[58] Field of Search ................. 521/56, 57, 59, 145; 526/202, 203, 344.2, 81

[56] References Cited

U.S. PATENT DOCUMENTS

| | | |
|---|---|---|
| 3,707,722 | 12/1972 | Nelson et al. ............... 521/80 M |
| 4,229,547 | 10/1980 | Cohen et al. ................. 521/56 |
| 4,435,524 | 3/1984 | Dinbergs ...................... 521/56 |
| 4,458,057 | 7/1984 | Basu .............................. 521/65 |
| 4,603,151 | 7/1986 | Dinbergs ...................... 521/145 |

*Primary Examiner*—Morton Foelak
*Attorney, Agent, or Firm*—Joe A. Powell

[57] ABSTRACT

Porous particles of vinyl resin are disclosed where said particles are non-spherical in shape, highly porous, skinless and friable. Processes are also disclosed for producing these novel particles. The particles are preferably PVC and exhibit an ability to absorb large amounts of plasticizer in a short time.

5 Claims, 6 Drawing Sheets

SKINLESS POROUS PARTICLE PVC RESIN AND PROCESS FOR PRODUCING SAME

This is a division of application Ser. No. 038,099, filed Apr. 14, 1987, now U.S. Pat. No. 4,711,908, issued Dec. 8, 1987.

BACKGROUND OF THE INVENTION

Polyvinyl chloride (PVC) resins are used in large quantities throughout the world. Typically these PVC resins are produced by one of three processes, suspension, emulsion or mass process. Emulsion produced PVC is very small in particle size such as 1 micron or less and is essentially non-porous. The emulsion process uses a relatively large amount of surfactants to make the small particle resins. PVC resins produced by the mass process are much larger, having a weight average particle size of from about 100 to 300 microns. The mass resin is produced in a process which normally does not use water and surfactants. The mass resin does not have a pericellular membrane around the particle. The absence of the pericellular membrane offers some advantages such as a purer product and faster uptake of plasticizer for a given porosity value of a resin, although mass resins are known for their low porosity.

By far the largest volume PVC resin is produced by the suspension process. Suspension produced PVC resins have about the same particle size and the same end uses as does mass produced resin. In the suspension process, surfactants such as cellulose materials or partially hydrolyzed acetate which is usually referred to as polyvinyl alcohol (PVA) are used to suspend vinyl chloride monomer droplets in water and the polymerization takes place in the monomer droplet usually aided by a free radical initiator.

In the suspension polymerization of PVC, droplets of vinyl chloride monomer 30–150 microns in diameter are dispersed in water by agitation and aided by surfactants. A thin membrane is formed at the water to monomer interface by dispersants such as PVA. This membrane has been measured at 0.01 to 0.02 micron thick, and has been found to be a graft copolymer of polyvinyl chloride and the dispersant(s). Early in the polymerization, particles of PVC deposit onto the membrane from both the monomer and the water sides forming a skin 0.5–5.0 microns thick that can be observed on grains sectioned after polymerization. Primary particles which are about 1 micron in size deposit on the skin from the monomer side and water phase polymerized PVC at about 0.1 micron in size deposits on the water side of the membrane.

In suspension polymerization, droplets of polymerizing PVC, 30–150 microns in size, agglomerate to form particles or grains of 100–200 microns in diameter. With one droplet per particle the shape is quite spherical. When several droplets agglomerate to form one particle, the shape can be quite irregular and knobby sometimes referred to as popcorn shaped.

Suspension produced PVC particles desirably have voids in the particle which is known as porosity. These voids (porosity) form when the various components of the particle agglomerate such as the primary particles and droplets. Porosity is a very important property of the resin because it not only allows the polymerized resin to be easily stripped of its residual monomer but also gives the resin the ability to absorb large quantities of plasticizers.

Not only is porosity important but also the particle shape is important. Spherical particles have several attributes such as fast extrusion and high bulk density. However, an agglomerated highly irregular particle has better ability to absorb plasticizer quickly because of its irregular shape.

When PVC particles are desired for a particular application which requires a "skinless" or "low skin" resin, then mass produced resin is usually the resin of choice. A previous suspension process was developed and is disclosed in U.S. Pat. No. 3,706,722 to Nelson, et al, which produces resin particles having "low skin" features. The term "low skin" as used herein refers to resin particles having less than 50% of their surface area as PVC as measured by ESCA technique. This process is known as a phase inversion process. In the early part of the polymerization, the monomer is the continuous phase and after about 10% conversion additional water is added such as to make the water the continuous phase and the monomer the discontinuous phase. This process in essence runs a mass type polymerization up to about 10% conversion and then inverts to a suspension type polymerization. The resultant resin particle, however, is a porous spherical shape particle and not the more desirable porous agglomerated irregular shape particle. Also, the prior inversion process results in very heavy polymer buildup on the internal surfaces of the polymerization equipment. This buildup is sometimes referred to as reactor fouling and is a highly undesirable feature.

It would be very desirable to have a PVC resin particle which would be skinless, highly porous, friable, have fast plasticizer uptake and have an agglomerated shape.

SUMMARY OF THE INVENTION

It is an object of this present invention to produce PVC resin in particulate form which are non-spherical, highly porous, friable and which are skinless or low-skin resins.

It is a further object of this invention to produce PVC resins which have short powder mix times.

It is a still further object of this invention to provide improved processes to produce the above skinless or low-skin resin particles.

It is another object of this invention to provide processes which will produce skinless or low-skin resins while preventing polymer buildup or scale on the internal surfaces of the polymerization equipment.

These and other objects will become apparent from the following description of the invention.

An agglomerated, highly porous, friable, skinless PVC resin in particulate form characterized by more than about 90% by weight of said resin particles having the following features:

(a) an agglomerated non-spherical shape having a shape factor less than about 0.85, preferably less than about 0.83, more preferably less than about 0.80;

(b) said particles are absent a substantially continuous pericellular membrane.

It is also preferred that more than 90% of said resin particles have the following features:

(c) a mercury porosity of from about 0.1 cc/g to about 0.7 cc/g, preferably from about 0.3 cc/g to about 0.5 cc/g;

(d) a weight average particle size of from about 70 microns to about 1000 microns, preferably from about 100 microns to about 250 microns;

(e) a friability less than about 2, preferably less than 1, more preferably 0;

(f) a powder mix time of less than about 400 seconds, preferably less than 300 seconds, more preferably less than 250 seconds;

(g) the surface area of said particles is greater than about 20% PVC, preferably greater than about 50%, more preferably greater than about 60% as measured by ESCA.

An improved process is provided for producing the novel particles of this invention comprising polymerizing vinyl chloride monomer in an agitated aqueous suspension wherein said aqueous medium contains as the primary dispersant small amounts of at least one ionic sensitive dispersant capable of thickening water and at least one secondary dispersant, wherein an ionic material is charged to the polymerization medium at from about 1% to 5% conversion of monomer to polymer and the ionic material desorbs a substantial amount of the ionic sensitive primary dispersant off the monomer droplet, thereby producing a skinless, agglomerated, highly porous, friable, PVC resin absent a continuous pericellular membrane.

An alternate improved process is also provided for producing the novel particles of this invention comprising polymerizing vinyl chloride monomer in an agitated aqueous suspension wherein said aqueous medium contains at least one primary dispersant capable of thickening water and at least one secondary dispersant wherein the levels of the primary and secondary dispersants are at very specific amounts such that a continuous pericellular membrane (skin) is not present on the resin particle.

A process to produce the low-skin resins of this invention is also provided. The low-skin process involves using extremely low levels of from about 0.01 to about 0.03 part by weight per 100 parts by weight of polymerizable monomer, of the water thickening primary dispersant(s) along with monomer-soluble secondary dispersants.

BRIEF DESCRIPTION OF THE DRAWINGS

FIG. 7 represents a standard pipe grade suspension process produced PVC resin having a skin. FIG. 7 is magnified 100 times actual size.

FIG. 9 represents a standard film grade suspension process produced PVC resin. FIG. 9 is magnified 100 times actual size.

DETAILED DESCRIPTION

Figure 1:
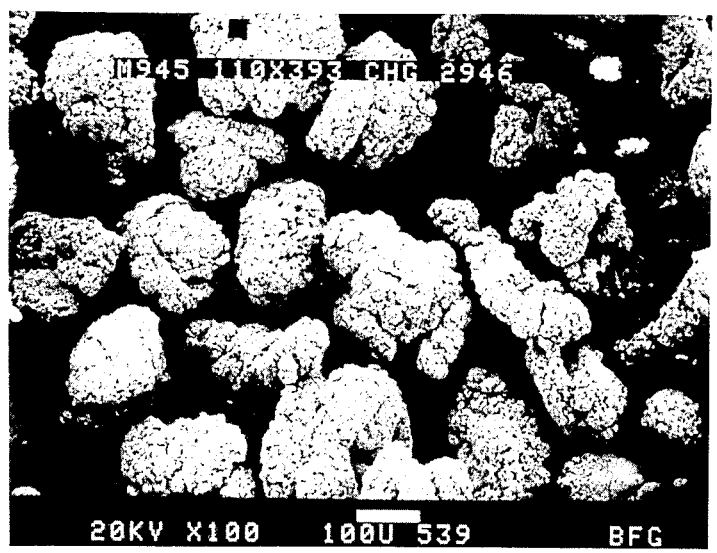
FIG. 1 is a photomicrograph of agglomerated, irregular shaped, highly porous resin particles of this invention magnified 100 times actual size. The particles of FIG. 1 were produced in Example I.

Polyvinyl chloride resin as used in this invention means polyvinyl chloride homopolymers as well as vinyl chloride polymerized with up to 50%, preferably up to 20%, by weight of one or more other vinylidene monomers having at least one terminal $CH_2=C<$ grouping. Suitable comonomers that may be polymerized with vinyl chloride are esters of acrylic acid, for example, methyl acrylate, ethyl acrylate, butyl acrylate, octyl acrylate, cyanoethyl acrylate, and the like; vinyl acetate; esters of methacrylic acid, such as methyl methacrylate, ethyl methacrylate, butyl methacrylate, and the like; styrene and styrene derivatives including α-methyl styrene, vinyl toluene, chlorostyrene; vinyl naphthalene; diolefins including butadiene, isoprene, chloroprene, and the like; and mixtures of any of these types of monomers and other vinylidene monomers copolymerizable therewith; and other vinylidene monomers of the types known to those skilled in the art. The amount of comonomer that can be polymerized with vinyl chloride is a function of the choice of comonomer, as is well understood by those skilled in the art. Preferably, the polyvinyl chloride polymers of this invention are polyvinyl chloride homopolymers. The invention will be described in terms of a polyvinyl chloride homopolymer as the preferred embodiment of this invention.

The process used to produce the novel resin particles of this invention is an agitated aqueous suspension process. In the process, water is the polymerization medium and a vinyl monomer to water ratio in the range of about 1.0:1.0 to 1.0:10.0 is satisfactory. Preferably, a ratio in the range of about 1.0:1.0 to 1.0:4.0 is employed.

An important feature of the process to prepare the resin particles of this invention is the dispersant system that is employed in the polymerization reaction for the purpose of stabilizing the dispersed monomer droplets. A colloidal unstable system will result in what is known as a solid charge, that is, the monomer droplets will agglomerate into large chunks which are unsuitable for use in normal PVC applications. A dispersant system which will not allow any agglomeration of monomer droplets will result in spherical particles. Such a process to produce spherical particles is described in U.S. Pat. No. 4,603,151. To obtain an agglomerated particle of this invention requires a delicate balance of having a few of the monomer droplets agglomerate but not excessive agglomeration such as to result in excessively large particles. An important component of this process is an ion sensitive dispersant which will thicken water.

Examples of such thickeners and how they are used are disclosed in U.S. Pat. No. 3,620,988, incorporated herein by reference. The ion sensitive dispersants which will thicken water are usually high molecular weight dispersants or crosslinked dispersants which will thicken water at concentrations of less than 2% in water, preferably less than 0.2%, and more preferably less than 0.1% concentration in water. Suitable ion sensitive thickening dispersants include crosslinked polyacrylic acid polymers, crosslinked ethylene malic anhydride polymers, high molecular weight uncrosslinked polyacrylic acid polymers and ethylene malic anhydride polymers, and the like. The invention will be explained in connection with a substantially unneutralized crosslinked interpolymer.

A suitable ion sensitive thickener is a substantially unneutralized crosslinked interpolymer of one or more carboxylic acid monomers with a polyunsaturated compound having a plurality of terminally unsaturated polymerizable groups, for example, a crosslinked polyacrylic acid polymer. The crosslinking is responsible for making the polyacrylic acid polymer incapable of forming a true solution in water. In this regard, these polyacrylic acid polymers are classified as being substantially insoluble in water. Nevertheless, the structure of the interpolymer must be such that it has enough affinity for water to swell appreciably in an aqueous medium, thus thickening the water phase, but not to the extent that it cannot be agitated rapidly. Interpolymers that have little or no affinity for water and do not swell to any measurable degree, are not suitable for the purpose of the present invention.

With respect to the crosslinked polymeric dispersants used in making the resin of the invention, the carboxylic acid monomers utilizable in preparing the same are those which contain at least one active carbon-to-carbon double bond in the $\alpha,\beta$-position with respect to a carboxyl group such as

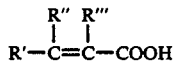  (1)

wherein R' is hydrogen or a —COOH group, and each of R" and R'" is a hydrogen or a monovalent substituent group which is linked to one of the doubly bonded carbon atoms. Carboxylic acids within this definition include acids, such as acrylic acid, wherein the double bond is terminal such as

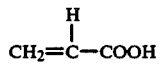  (2)

or the dicarboxylic acids such as maleic acid and other anhydrides of the general structure

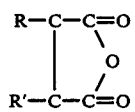  (3)

wherein R and R' are monovalent substituent groups and especially those selected from the group consisting of hydrogen and halogen groups and alkyl, aryl, alkaryl, aralkyl, and cycloaliphatic radicals.

Included within the class of carboxylic acids, shown by generic formula (1) above, are widely divergent materials, such as the acrylic acids, such as acrylic acid itself, methacrylic acid, ethacrylic acid, $\alpha$- and $\beta$-chloro and bromo-acrylic acids, crotonic acid, maleic acid, itaconic acid, and many others.

Polymerizable carboxylic anhydrides include any of the anhydrides of the above acids, including mixed anhydrides, and those shown by generic formula (3) above, including maleic anhydride, and others. In many cases, it is preferred to copolymerize an anhydride monomer with a comonomer, such as methyl vinyl ether, styrene, ethylene, and the like.

It is preferred to employ polymeric dispersants which are derived from polymers produced by the polymerization of the $\alpha,\beta$-monoolefinically unsaturated carboxylic acids. The preferred carboxylic acids are those derived from the acrylic acids and $\alpha$-substituted acrylic acids having the general formula

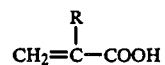

wherein R is a monovalent substituent selected from the group consisting of hydrogen, halogen, hydroxyl, carboxyl, amide, ester, lactone, and lactam.

The most preferred polymeric dispersants are those prepared from the lightly crosslinked interpolymers of acrylic acid. These dispersants are the most effective.

The crosslinking agents which may be employed with any of the carboxylic monomers, or mixtures thereof, may be any compound, not necessarily monomeric in nature, containing two or more terminal polymerizable $CH_2=C<$ groups per molecule. Examples of this class of materials include polyunsaturated-hydrocarbons, -polyethers, -polyesters, -nitriles, -acids, -acid anhydrides, -ketones, -alcohols and polyunsaturated compounds of this class incorporating one or more of these and other functional groups. Specifically, there may be utilized divinyl benzene, divinyl naphthalene, low-molecular weight and soluble polymerized dienes, such as polybutadiene and other soluble homopolymers of open chain aliphatic conjugated dienes, which soluble polymers do not contain any appreciable number of conjugated double bonds, and other polyunsaturated hydrocarbons; polyunsaturated esters, ester-amides and other ester derivatives, such as ethylene glycol diacrylate, ethylene glycol dimethacrylate, allyl acrylate, methylene bisacrylamide, methylene bismethacrylamide, triacrylyl triazine, hexallyl trimethylene trisulfone, and many others; polyunsaturated ethers, such as divinyl ether, diallyl ether, dimethyl allyl ether, diallyl ethylene glycol ether, diallyl, triallyl and other polyallyl ethers of glycerol, butene-1,2-diol, 1-phenyl-1,2,3-propanetriol, the polyallyl, -vinyl and -crotyl polyethers containing from two to seven or more of these or other alkenyl ether groupings per molecule and made from polyhydric alcohols, such as the carbohydrate sugars, and the so-called "sugar alcohols", including erythritol, pentaerythritol, arabitol, iditol, mannitol, sorbitol, inositol, raffinose, glucose, sucrose, and many others, and other polyhydroxy carbohydrate derivatives, the corresponding polyalkenyl silanes, such as the vinyl and allyl silanes, and others. Of this large class of crosslinking agents, the polyalkenyl polyethers of the carbohydrate sugars, sugar alcohols and other polyhydroxy carbohydrate type derivatives containing from two to seven alkenyl ether groups per molecule are particularly useful. Such materials are easily prepared by a Williamson-type synthesis involving the reaction of an alkenyl halide, such as allyl chloride, allyl bromide, methallyl chloride, crotyl chloride, and the like, with a strongly alkaline solution of one or more of the poly-hydroxy carbohydrate derivatives.

In the monomeric mixture, for making the crosslinked polymers employed as primary dispersants in the suspension polymerization process used in this invention, the two essential monomeric materials should be present in certain proportions, although the exact proportions will vary considerably depending on the characteristics desired in the polymer. Small amounts of the polyalkenyl polyether copolymerize quite readily with carboxylic monomers and the crosslinking effect of the polyalkenyl polyether on the carboxylic monomer is so strong that as little as 0.1% by weight thereof, based on the weight of the total mixture, produces a great reduction in the water and solvent-solubility of the resulting crosslinked polymer. When 0.1% to 4.0%, more preferably 0.20% to 2.5%, by weight of the polyether is utilized, water-insoluble polymers are obtained, especially with acrylic acids, which are extremely water sensitive. Useful dispersants are also obtained when 0.1% to 6.0%, and preferably 0.2% to 5%, of the polyether is copolymerized with maleic anhydride. In the dual copolymer, or two-compound interpolymer, this means that the remainder of the monomeric mixture will be the carboxylic monomer.

The monomeric proportions employed in the production of multi-component interpolymers may vary in a somewhat similar manner. However, it is generally desirable to utilize as much of the carboxylic monomer or monomers and as little of the other monomeric constituents as is consistent with the desired water-insolubility and other properties. In these interpolymers, therefore, the carboxylic monomer or monomers whould never be less than 25%, and preferably not less than 40%, by weight of the total monomeric mixture. Multicomponent interpolymers may be made from monomeric mixtures comprising from 25% to 95% of a carboxylic monomer, such as acrylic acid, 0.1% to 30% of a polyalkenyl polyether, such as polyallyl polyether of sucrose, and 5.0% to 74.9% of an additional monomer or monomers. Preferred multi-component interpolymers are the tripolymers resulting from the polymerization of monomeric mixtures containing, respectively, from 40% to 95% by weight of acrylic acid, 0.20% to 2.5% by weight of polyallyl polyether, such as that of sucrose, and 4% to 59% of an additional monomer or monomers, such as maleic anhydride, N-methyl acrylamide, methyl vinyl ether, ethyl vinyl ether, n-butyl vinyl ether, and the like, and mixtures of maleic anhydride, a vinyl alkyl ether, such as vinyl methyl ether, and a polyallyl polyether, in which the sum of the moles of vinyl ether and polyallyl polyether is substantially equivalent to the molar quantity of maleic anhydride present. It should be borne in mind that in the above proportions, if a maximum amount of two of the monomers are utilized, that somewhat less than maximum amounts of the other monomers must be utilized.

Suitable for use as additional monomers in the production of multi-component interpolymers are monoolefinic vinylidene monomers containing one terminal $CH_2=C<$ group, such as styrene, the chloro and ethoxy-styrenes, etc., acrylamide, N-methyl-acrylamide, N,N-dimethyl acrylamide, acrylonitrile, methacrylonitrile, methyl acrylate, ethyl acrylate, 2-ethylhexylacrylate, methyl methacrylate, vinyl acetate, vinyl benzoate, vinyl pyridine, vinyl chloride vinylidene chloride, vinylidene chlorobromide, vinyl carbazole, vinyl pyrrolidone, methyl vinyl ether, ethyl vinyl ether, n-butyl vinyl ether, methyl vinyl ketone, ethylene, isobutylene, dimethyl maleate, diethyl maleate, and many others. In addition to the above monoolefinic monomers, many of the divinyl dialkenyl or other polyfunctional esters, amides, ethers, ketones, and the like, may be used in the production of multi-component interpolymers, especially those polyfunctional monomers which nominally function as crosslinking or insolubilizing monomers but which are easily saponified and hydrolyzed to additional hydroxyl, carboxyl and other hydrophilic groups. For example, an interpolymer of acrylic acid and divinyl ether is insoluble in water but upon standing gradually goes into solution probably due to hydrolysis and breaking of divinyl ether crosslinks. The presence of strong alkali or acid speeds dissolution. Spectroscopic analysis confirms the presence in the polymers of non-carboxylic hydroxyls. Similarly, diesters, such as diallyl maleate, ethylene glycol dimethacrylate, acrylic anhydride, betaallyloxy acrylate, and many others, are readily saponified or hydrolyzed by alkali or acid with the introduction of additional hydroxyl and/or carboxyl groups. Of the additional monomers, N-methyl acrylamide, methyl vinyl ether, ethyl vinyl ether and divinyl ether have been found particularly useful in the production of the substantially unneutralized crosslinked interpolymers for use as ion sensitive dispersants in the suspension polymerization of vinyl monomers.

The amount of the water-insoluble substantially unneutralized crosslinked interpolymer useful as an ion sensitive dispersant, in the process of making the novel resins of this invention will vary in the range of about 0.01 parts by weight to about 0.1 parts by weight, based on 100 parts by weight of the monomer or monomers being polymerized. Preferably, the amount used will be in the range of about 0.02 parts by weight to about 0.06 parts by weight per 100 parts by weight of monomer or monomers being polymerized.

In the process to make the novel resins of this invention, other secondary dispersants are preferably employed, along with the ion sensitive dispersant. Dispersants which tend to form a skin on the resin particles such as methyl cellulose and high hydrolysis (above 70%) polyvinyl acetate should be avoided. The secondary dispersants should be monomer soluble and not fully soluble in water. For PVA secondary dispersants, the higher the % hydrolysis, the more water soluble the dispersant. For example, 30% hydrolyzed PVA is monomer soluble and not water soluble, 55% hydrolyzed PVA is very soluble in the vinyl monomer but is also partially soluble in water. 72.5% hydrolyzed PVA is fully water soluble and therefore not acceptable. The fully water soluble dispersants will form a skin on the polymer particle. Oil-soluble non-polyethylene oxide containing secondary dispersants are suitable for use in this invention. Suitable non-polyethylene oxide containing secondary dispersants are those compounds from the sorbitan ester family or the glycerol ester or polyglycerol ester families, as well as the low hydrolysis (less than 70%, preferably less than 60%, and more preferably less than about 55%) polyvinyl acetates, which do not contain polyethylene oxide segments. As examples of such dispersants, there may be named sorbitan trioleate, sorbitan tri-stearate, sorbitan monooleate, sorbitan monopalmitrate, glycerol monooleate, glycerol monostearate, triglycerol monooleate, 50% hydrolyzed polyvinyl acetate, and the like. A mixture of more than one of these dispersants may be used. The function of the secondary dispersants is to increase the porosity of the polymer particles and to increase the colloidal stability of the polymerization mixture. The non-polyethylene oxide containing dispersant is used at a level of from about 0.005 part by weight to about 1.0 part by weight per 100 parts by weight of monomer, preferably from about 0.1 part by weight to about 0.4 part by weight per 100 parts by weight of monomer. More than one secondary dispersant may be used in this invention to achieve the secondary dispersant level.

The polymerization is initiated with a free radical catalyst. The monomer-soluble or oil-soluble catalysts that may be used in the polymerization process of this invention are the alkanoyl, aroyl, alkaraoyl, and aralkanoyl diperoxides and monohydroperoxides, azo compounds, peroxy ester, percarbonates, and other free radical type catalysts. As examples of such catalysts, there may be named benzoyl peroxide, lauryl peroxide, diacetyl peroxide, cumene hydroperoxides, methyl ethyl ketone peroxide, diisopropylbenzene hydroperoxide, 2,4-dichlorobenzoyl peroxide, naphthoyl peroxide, t-butyl perbenzoate, di-t-butyl perphthalate, isopropyl percarbonate, acetyl cyclohexane sulfonyl peroxide, disecondary butyl peroxydicarbonate, 5-butyl peroxyneodecanoate, di-normal propyl peroxydicarbonate, azo-bis isobutyronitrile, $\alpha,\alpha'$-azodiisobutyrate, 2,2'-azobis-(2,4-dimethyl valeronitrile), and many others. The particular free radical catalyst employed will depend upon the monomeric material(s) being polymerized, the molecular weight and color requirements of the polymer, the temperature of polymerization, etc. Insofar as the amount of catalyst employed is concerned, it has been found that an amount in the range of about 0.005 parts by weight to about 1.00 parts by weight, based on 100 parts by weight of the monomer or monomers being polymerized, is satisfactory. However, it is preferred to employ an amount of catalyst in the range of about 0.01 part by weight to about 0.20 part by weight based on 100 parts by weight of monomer(s).

The suspension polymerization process of this invention may be carried out at any temperature which is normal for the monomeric material to be polymerized. Preferably, a temperature in the range of about 0° C. to about 100° C. is employed, more preferably from about 40° C. to about 80° C. In order to facilitate temperature control during the polymerization process, the reaction medium is kept in contact with cooling surfaces cooled by water, brine, evaporation, etc. This is accomplished by employing a jacketed polymerization reactor wherein the cooling materials is circulated through the jacket throughout the polymerization reaction. This cooling is necessary since most all of the polymerization reactions are exothermic in nature. It is understood, of course, that a heating medium can be circulated through the jacket, if necessary.

The preferred process to produce resins of this invention involves using an ionic material to desorb the primary dispersant off the resin. Suitable ionic materials are bases which will neutralize the polyacrylic acid primary dispersant and form a salt. Preferably, the ionic material is a monovalent inorganic or organic base such as amines, sodium hydroxide, ammonium hydroxide, potassium hydroxide, lithium hydroxide, and the like. The most preferred ionic material is sodium hydroxide. Divalent and trivalent materials can crosslink the polyacrylic acid primary dispersant and would therefore not normally be chosen as the ionic material. The preferred embodiment of this invention will be described in terms of using sodium hydroxide as the ionic material. The primary dispersant protects the monomer droplets at the very early stages of polymerization. Before the primary dispersant can graft polymerize with the vinyl chloride, NaOH is added to the polymerization medium. The ion sensitive primary dispersant will then swell in size and desorb off the droplet. Protection of the droplet is accomplished after this point by the increased size of the primary dispersant. The NaOH must be added early in the polymerization, usually from 0.5% to 5.0% conversion of monomer to polymer. If the NaOH is added at the beginning or before about 0.5% conversion, the primary dispersant will be desorbed off the droplet too early and could result in an unstable suspension. Preferably the NaOH is added at from 1% to 3% conversion, more preferably 1% to 2% conversion. Since the primary dispersant is desorbed from the droplet and polymerization is continued without a primary dispersant on the particle, the resulting resin is essentially skin-free. Of course, some primary dispersant can become attached to the resin particle without departing from this invention but there cannot be a continuous pericellular membrane present as there is in normal suspension PVC resin.

The amount of NaOH typically added is an amount sufficient to raise the pH about 0.5 to 1.0 point. Usually the amount of NaOH needed to desorb the primary dispersant is from about 0.0010 part by weight to about 0.0100 part by weight per 100 parts of monomer. More could be used but it would not serve a useful purpose.

If an ion sensitive dispersant is used which will thicken by lowering pH, then rather than adding NaOH to desorb the dispersant, HCl could be used. The HCl would work in the same fashion as described above and should be added at similar low conversion levels as described above.

An alternate process to produce the low skin resins of this invention is to use extremely low levels of the ion sensitive primary dispersant. Levels of from about 0.01 to about 0.03 parts by weight per 100 parts by weight of polymerizable monomer should be used in this alternate method. If these low levels are used, then it is not necessary to use the NaOH to desorb the primary dispersant from the monomer droplet. Secondary dispersants at levels described above are used in this alternate method.

An additional alternate process to produce the resins of this invention involves the use of a combination of dispersants. The combination of dispersants are non-polyethylene oxide containing secondary dispersants such as sorbitan esters, for example sorbitan monooleate and non-polyethylene oxide containing dispersants such as low hydrolysis PVA, and primary dispersant polyacrylic acid. Sorbitan esters are effective porosifiers but in amounts greater than 0.1 part they tend to be highly destabilizing. It was also found that higher levels of about 0.2 to 0.4 part of sorbitan ester would prevent the formation of a skin by the primary dispersant. It was also unexpectedly found that low hydrolysis PVA (less than 70%, preferably less than 60%, more preferably less than about 55%) in amounts of from about 0.1 to 0.3 part by weight would counteract the destabilizing effect of sorbitan ester. The level of polyacrylic acid dispersant used in this process to give skinless resin will vary depending upon the level of PVA. For levels of PVA of about 0.3 part, the polyacrylic acid dispersant needs to be less than 0.04 part, whereas for levels of PVA of about 0.1, the level of polyacrylic acid dispersant can be higher, such as about 0.06. As the level of PVA increases, the level of polyacrylic acid dispersant must decrease to obtain a skinless resin. High hydrolysis PVA's greater than 70% and dispersants such as methyl cellulose should be avoided because they will form a skin on the resin.

Reactor Charging Procedure

In the preferred process to produce skinless resins of this invention, a charging procedure similar to the one disclosed in my U.S. patent application Ser No. 846,163 filed Mar. 31, 1986, incorporated herein by reference, should be used. The procedure used is what is known as a one poly floating method. The free radical catalyst is first mixed with a solvent, such as isopropol alcohol, in the preferred process. This technique of using a catalyst solution and its added benefits are fully disclosed in the above incorporated patent application. The polymerization reactor charging procedure is explained in the steps below.

(a) Charge water and ion sensitive primary dispersant(s) capable of thickening water to the polymerization vessel. The primary dispersant(s) can be added as such but is preferably added as a concentrated mixture with water. The water and primary dispersant(s) may be premixed before charging to the polymerization vessel. The charge water is preferably demineralized water.

(b) Agitate the water and primary dispersant(s) until an emulsion is formed.

(c) Reduce or stop the agitation such that non-turbulent flow is achieved.

(d) Charge the monomer(s) to be polymerized to the reactor vessel such that said monomer floats on top of the emulsified thickened aqueous layer.

(e) Charge a solution comprising a solvent and the free radical catalyst and optionally the secondary dispersant(s) to the reactor. If the secondary dispersant(s) are not combined with the catalyst solution, then they should have been premixed with the monomer before adding to the reactor.

(f) Allow the catalyst solution to diffuse through the monomer layer.

(g) Increase the agitation such that the entire polymerization medium is emulsified.

(h) Conduct to polymerization until 1% to 2% conversion is reached, then add NaOH to desorb the primary dispersant from the monomer droplet.

(i) Continue the polymerization until the desired degree of polymerization is achieved.

An alternate charging method, known as the two poly method, is to first add the monomer(s) to the reactor together with the solution containing the catalyst and secondary dispersant(s). The catalyst solution could, of course, be premixed with the monomer prior to adding to the reactor vessel, in which case agitation would not be necessary after adding to the reactor. This mixture is then agitated thoroughly. The thickened water, which had been previously made up by mixing the ion sensitive thickening primary dispersant(s) with water, is charged into the bottom of the reactor through a bottom entry port. Agitation is then re-started and polymerization conducted as above.

The catalyst could also be charged neat into the water phase containing the primary dispersant. If this method were used, then the catalyst would not first be premixed with the solvent.

The polymer particles produced by the present invention should have an average diameter by weight greater than about 70 microns. The particles could have an average diameter up to 1000 microns but normally, the polymer particles will have an average diameter by weight less than about 300 microns. Preferably, for most end uses, the polymer particles will have a diameter in the range of about 100 microns to about 250 microns, most preferably from about 125 microns to about 200 microns. Resins with an average particle size by weight less than 70 microns tend to be dusty and build up static easily such that they are less desirable.

The resin particles produced by this invention are agglomerated non-spherical in shape. A very good method to measure the spherical shape of resins is to determine the shape factor by optical procedures. The image of the particle is projected onto a flat surface to provide a two dimensional view. The shape factor of a particle is determined by inscribing and circumscribing the resin particles flat image with a circle. The ratio of the diameters of the inscribed circle to the circumscribed circle is the number known as the shape factor.

In the case of a perfect circle, the inscribed and circumscribed circles would have the same diameter and, therefore, the shape factor would be unity (1.0). The more near the shape factor is to 1.0 the more spherical the particle.

The shape factor of the resin particles made by this invention is less than about 0.85, preferably less than about 0.83, and more preferably less than about 0.80.

The resin particles made by this invention also have high porosity of from about 0.10 cc/g to about 0.7 cc/g as measured using mercury porosimeter. Preferably, the mercury porosity is from about 0.30 cc/g to about 0.50 cc/g. Porosity is measured according to ASTM D-2873 procedure. Sometimes porosity is measured as DOP porosity, which gives results about 0.02 cc/g higher than mercury porosity values reported herein for the same resin.

The resins of this invention must also be low-skin or skinless. The terms low-skin and skinless as used in this specification mean that the resin does not have a continuous pericellular membrane as does a typical PVC resin. There may be discontinuous areas or spots of skin on the resin surface but the resin would still be considered skinless under the meaning used in this invention. The term low-skin is used to refer to particles having less than 50% PVC on their surface whereas the term skinless refers to particles having 50% or greater PVC on their surface.

One method to characterize skinless resins is determine the composition of the surface of the resin particle by use of XPS (ESCA) technique. If a resin was totally skinless, there would not be any primary dispersant on the surface. The surface of the resins of this invention will have less than 40%, preferably less than 25%, and more preferably less than 10%, of the primary dispersant, as measured by ESCA technique. The surface will consist mainly of PVC and secondary surfactants (porosifiers).

The resin particles of this invention have a surface composition as measured by ESCA greater than about 20% PVC, preferably greater than about 50%, more preferably greater than about 60%. This indicates that the particles have a significant portion of holes in their skin, where said holes allow the plasticizer to easily pass into and be absorbed by the particle. ESCA is an acronym that stands for electron spectroscopy for chemical analysis. The ESCA technique involves irradiating the sample with X-rays from an X-ray tube. The x-rays knock electrons out of the atoms that are on the surface of the sample. The energy and number of these electrons are measured. From that information one can determine what elements are present. The depth of analysis of ESCA is about 20 to 30 angstroms which is about 5 or 6 monolayers of atoms on the surface of a sample. One should keep in mind that the ESCA test conducts an analysis of the surface visible to the ESCA. In a skinless or low skin resin, pores are open to the surface, therefore the X-rays are going into the pores and the results reflect an analysis of the bottom of the pore as well as the outermost surface of the resin particle. This explains to a great deal why the ESCA analysis of a skinless resin shows the secondary dispersant present. The secondary dispersant is believed to be present on the primary particles which are visible when looking into the pores. The interior of the pores can be seen from the 5000 magnification photomicrographs of FIG. 3 and FIG. 6.

Another method to determine if a resin is skinless is to look at the resin under magnification or take microphotographs of resin particles and observe if a continuous skin or pericellular membrane exists. In a microphotograph, an observer can see into the internal area of the resin particles of this invention. The high porosity, friable particles appear like a sponge with many openings in the surface of the resin particle. These openings allow for fast plasticizer uptake and create a friable particle which is easily broken down into smaller units (primary particles).

The resin particles of this invention also have a fast powder mix time as measured using a torque rheometer according to ASTM D-6373. The resin particles of this invention have a powder mix time of less than about 400 seconds, preferably less than 300 seconds, more preferably less than 250 seconds.

The resins of this invention must also have good friability. The friability value of a resin is an indication of the relative ease with which grains break down into agglomerates and finally to primary particles. The lower a resin's friability value, the more desirable the resin. High friability values are known to relate to temporary fish-eyes and surface roughness in flexible extrudates. Fish-eyes are undesirable areas in a product, such as a film, which are areas of non-uniformity. This is especially important in powder extrusion and high plasticizer applications. One method to test PVC resin for friability is to place a given amount of resin in a mortar and grind the resin with a pestle. The better the friability, the easier the resin particles will break apart. The friability is then subjectively graded on a scale of from 0 to 5, with 0 being very friable and equivalent to the best known PVC for friability. A level of 5 is equivalent to a high quality film grade resin. Values between 0 and 5 are rated as to how they compare with reference standards which are blends of a 0 value resin and a 5 value resin. The resins of this invention have a friability value of about 2 or less, preferably they have a friability value of 1 or less, and more preferably they have a friability value of 0.

For reference, make up standards using blends of Geon ®92 (a skinless spherical PVC resin produced by B. F. Goodrich according to the process of U.S. Pat. No. 3,706,722) and well known for its excellent friability and Geon ®30 (a high quality film grade PVC resin with a skin produced and sold by B. F. Goodrich) as follows:

Reference Standard "0" is a mix of Geon 92: 100 parts and Geon 30: 0 parts.
Reference Standard "1" is a mix of Geon 92: 80 parts and Geon 30: 20 parts.
Reference Standard "2" is a mix of Geon 92: 60 parts and Geon 30: 40 parts.
Reference Standard "3" is a mix of Geon 92: 40 parts and Geon 30: 60 parts.
Reference Standard "4" is a mix of Geon 92: 20 parts and Geon 30: 80 parts.
Reference Standard "5" is a mix of Geon 92: 0 parts and Geon 30: 100 parts.

Compare the friability of the resin tested to the friability of the reference standards. Choose the standard which most closely corresponds to the test resin and report that standard as the friability of the test resin.

To further illustrate the present invention, the following specific examples are given, it being understood that this is merely intended in an illustrative and not a limitative sense. In the examples, all parts and percents are by weight unless otherwise indicated.

EXAMPLE I

This Example is presented to demonstrate a process to produce the skinless resin of this invention. A 3 liter reactor equipped with agitation and cooling means was used in this Example. The following polymerization recipe was used:

| Ingredient | Parts by Wt. |
| --- | --- |
| Vinyl Chloride | 100 |
| Water (demineralized) | 182.1 |
| Polyacrylic Acid Dispersant | 0.02 |
| NaOH | 0.005 |
| Isopropyl Alcohol | 0.570 |
| Low Hydrolysis (55%) PVA | 0.300 |
| Di-secondary Butyl Peroxydicarbonate | 0.030 |
| Phenolic Shortstop | 0.015 |

The ingredients were charged according to the reactor charging procedure disclosed in this specification. The reaction was conducted at 53° C. The NaOH was charged as a 2% solution in water after 15 minutes into the reaction (about 1% conversion). At 290 minutes the reaction was terminated with the phenolic shortstop. The resin was removed from the reactor, stripped of residual monomer and dried to a free flowing powder.

The resin particles were agglomerated, irregular shaped porous resin particles with the following properties:

| | |
| --- | --- |
| Weight average particle size | 189 microns |
| Mercury porosity | 0.437 cc/gm |
| Powder mix time | 259 seconds |
| Shape factor | 0.73 |
| Surface composition as measured by ESCA: | |
| PVC | 67.9% |
| Polyacrylic acid dispersant | 22.5% |
| Polyvinyl alcohol dispersant | 9.6% |

Figure 2:
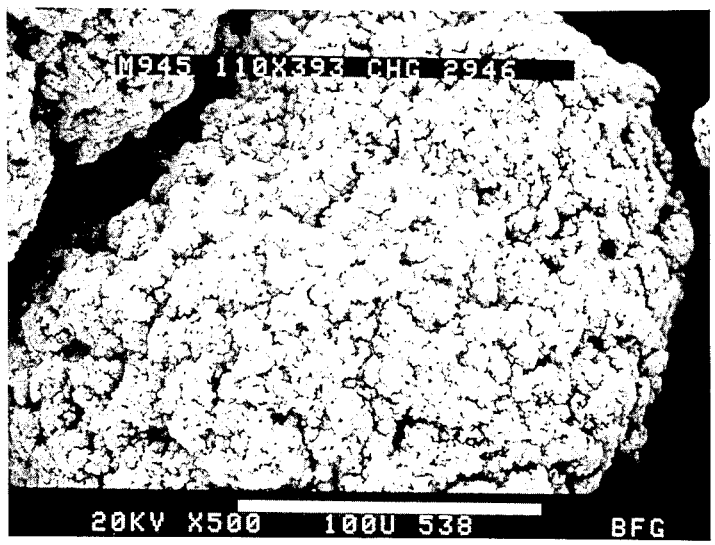
FIG. 2 is a photomicrograph of a particle produced in Example I (same as FIG. 1) with a magnification of 500 times actual size.
Figure 3:
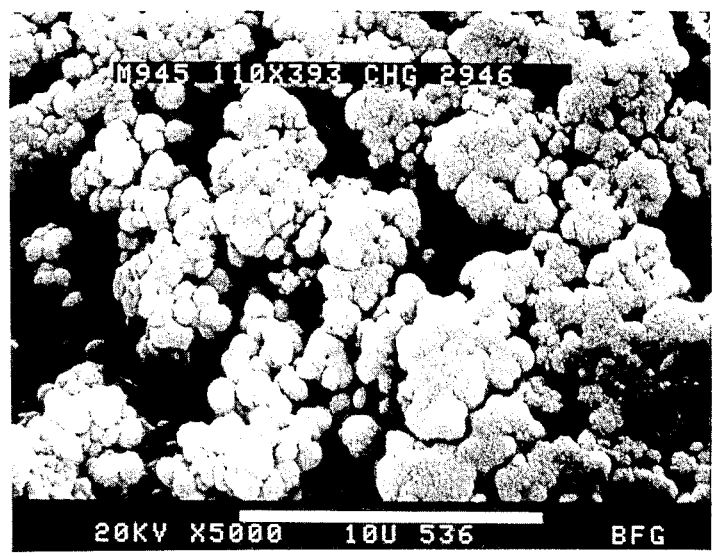
FIG. 3 is a photomicrograph of the particle of FIG. 2 magnified 5000 times actual size.

The high amount of PVC on the surface is an indication of a skinless resin. The low shape factor (0.73) is an indication of an irregular shape. The shape and skinless nature of the particles can also be observed by referring to FIGS. 1, 2 and 3. FIG. 1 is a photomicrograph of the resin particles produced in this Example I magnified 100 times, where the porous structure and irregular shape can be observed. FIG. 2 is the same resin magnified 500 times. FIG. 3 is the same resin magnified 5000 times. FIG. 3 shows the surface of one particle. The internal structure of the particle is visible along with the approximately 1 micron or less size primary particles that go into making up the particle. As can be seen from FIG. 3, there is very little skin on the resin. The high porosity (voids) is also visible from FIG. 3. These voids are available to absorb high amounts of plasticizer quickly.

EXAMPLE II

This Example is presented as a further demonstration of a process to produce the skinless resin of this invention. The recipe and conditions are similar to those of Example I. A 3-liter reactor equipped with agitation and cooling means was used in this Example similar to Example I. The following polymerization recipe was used:

| Ingredient | Parts by Weight |
| --- | --- |
| Vinyl chloride | 100 |
| Water (demineralized) | 182.1 |
| Polyacrylic acid dispersant | 0.02 |
| NaOH | 0.005 |
| Isopropyl alcohol | 0.570 |
| Low hydrolysis (55%) PVA | 0.300 |
| Di-secondary butyl Peroxydicarbonate | 0.030 |
| Phenolic shortstop | 0.010 |

The ingredients were charged according to the reactor charging procedure disclosed in this specification. The reaction was conducted at 53° C. The NaOH was charged as a 2% solution in water after 15 minutes into the reaction (about 1% conversion). At 350 minutes the reaction was terminated with the phenolic shortstop. The resin was removed from the reactor, stripped of residual monomer and dried to a free flowing powder.

The resin particles were agglomerated, irregular shaped resin particles with the following properties:

| | |
| --- | --- |
| Weight average particle size | 175 microns |
| Mercury porosity | 0.421 cc/gm |
| Powder mix time | 245 seconds |
| Shape factor | 0.77 |
| Surface composition as measured by ESCA: | |
| PVC | 55.3% |
| Polyacrylic acid dispersant | 0% |
| Polyvinyl alcohol dispersant | 44.7% |

Figure 4:
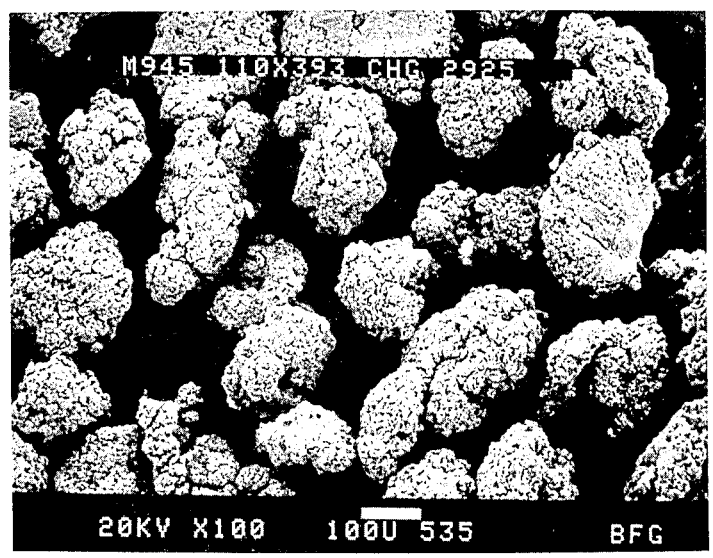
FIG. 4 is a photomicrograph of agglomerated, irregular shaped, highly porous resin particles of this invention magnified 100 times actual size. The particles of FIG. 4 were produced in Example II.
Figure 5:
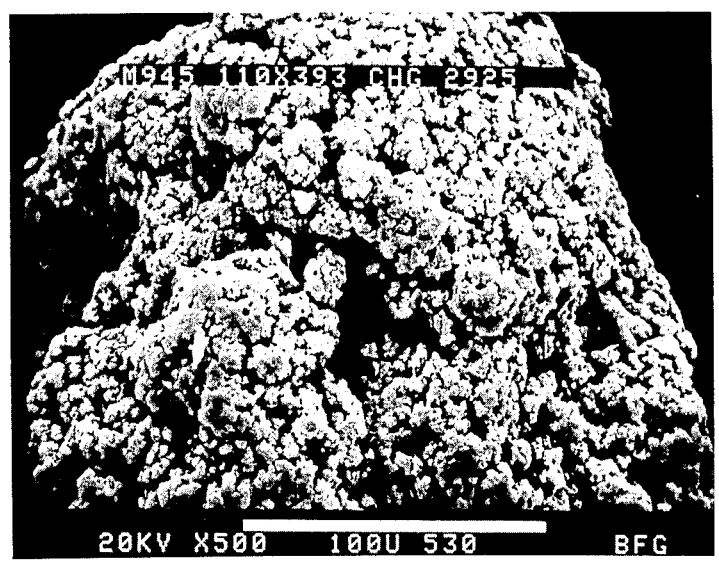
FIG. 5 is a photomicrograph of a particle produced in Example II (same as FIG. 4) with a magnification of 500 times actual size.
Figure 6:
FIG. 6 is a photomicrograph of the particle of FIG. 5 magnified 5000 times actual size.

The high amount of PVC on the surface and the absence of the primary dispersant is an indication of a skinless resin. The low shape factor 0.77 is an indication of an irregular shape. The shape and skinless nature of the particles can also be observed by referring to FIGS. 4, 5 and 6. FIG. 4 is a photomicrograph of the resin particle produced in this Example II magnified 100 times, where the porous structure and irregular shape can be observed. FIG. 5 is the same resin magnified 500 times. FIG. 6 is the same resin magnified 5000 times. FIG. 6 shows the surface of one particle. The internal structure of the particle is visible along with the primary particles which are about 1 micron or less in size, and go into making up the resin particles. As can be seen from FIG. 6, there is very little skin on the resin. The resin also noticeably has high porosity (voids) which are available to absorb high amounts of plasticizer quickly.

EXAMPLE III

This Example is presented to show the comparative properties of skinlessness and shape of resins of this invention to a resin produced by the process of reference U.S. Pat. No. 3,706,722, Nelson, et al and to a resin produced by the mass process. The resin of Nelson, et al was a standard production resin which is marketed as a skinless, high porosity resin. The photomicrographs in the reference Nelson, et al show the resin to be relatively spherical in shape and to be porous.

| Property | Mass Process | Nelson et al | Example I | Example II |
| --- | --- | --- | --- | --- |
| Shape factor | 0.88 | 0.91 | 0.73 | 0.77 |
| % PVC on surface | 100% | 27.9% | 67.9% | 55.3% |
| Agglomerated | No | No | Yes | Yes |

As can be seen from the above comparison, the resins of this invention have higher % PVC on the surface of the resin thus indicating a much higher degree of skinlessness (about twice that of Nelson, et al resin). The resins of this invention are also agglomerated irregular shaped thus having a lower shape factor than mass process resin or Nelson, et al's resin. This shape factor and higher amount of skinlessness allows resins of this invention to absorb plasticizer more quickly than Nelson et al resin, even at the same porosity levels. Mass resins, since there are no surfactants present, will have 100% of the surface as PVC. Mass resins are much more spherical than the agglomerated resins of this invention. The mass resins are also known for having low porosity as compared to suspension resins.

EXAMPLE IV

Figure 7:
FIG. 7 is a photomicrograph of an agglomerated, irregular shaped resin with a skin essentially continuous over the resin particles' surface. This
Figure 8:
FIG. 8 is a photomicrograph of a particle of the resin of FIG. 7 magnified 500 times actual size.

This Example is presented to demonstrate an agglomerated, non-spherical resin having a skin. FIGS. 7 and 8 represent a standard production PVC pipe resin having a skin and being agglomerated. FIG. 7 is a microphotograph showing a standard suspension process produced PVC resin magnified 100 times actual size. FIG. 8 is the same resin as is in FIG. 7 except one of the particles is magnified 500 times actual size. As can be seen, the resin has an essentially continuous skin covering the resin particle. The skin is a graft polymer of the dispersant used with vinyl chloride. The shape factor of the resin shown in FIGS. 7 and 8 is 0.76.

EXAMPLE V

Figure 9:
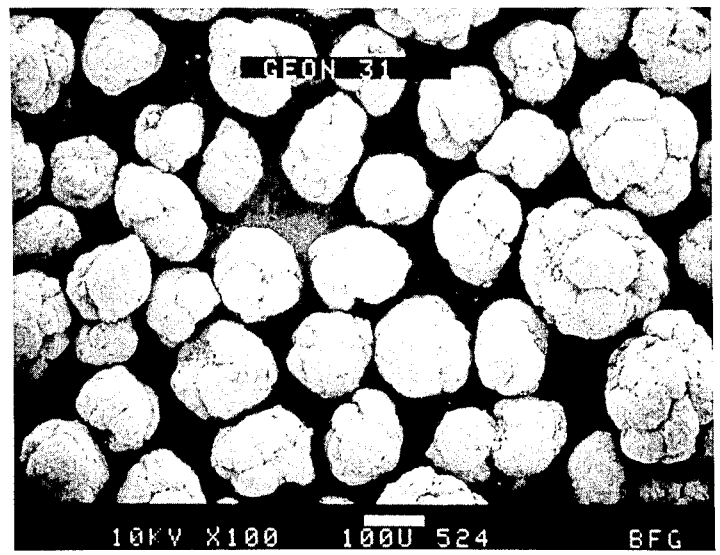
FIG. 9 is a photomicrograph of an agglomerated, non-spherical porous resin with a skin essentially continuous over the resin particle surface. This
Figure 10:
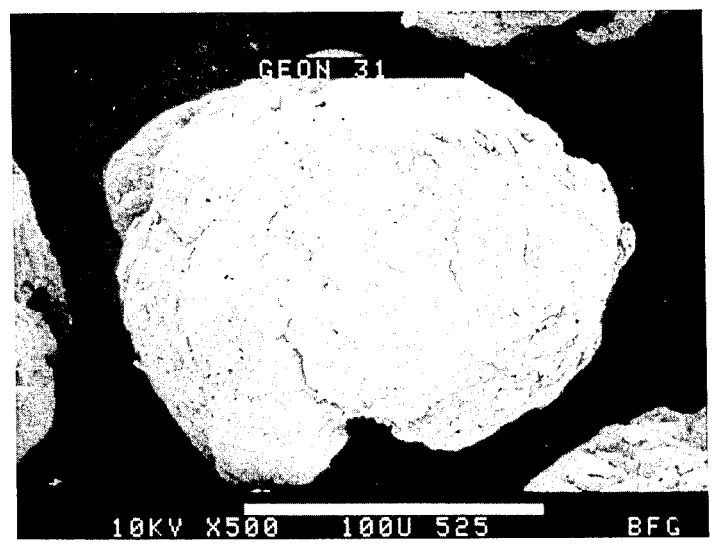
FIG. 10 is a photomicrograph of a particle of the resin of FIG. 9 magnified 500 times actual size.

This Example is presented to demonstrate an agglomerated, highly porous, non-spherical resin having a skin. FIGS. 9 and 10 represent a standard production PVC film grade resin having a skin and being agglomerated and having higher porosity than the resin of Example IV (FIGS. 7 and 8). FIG. 9 is a magnification of 100, whereas FIG. 10 is a 500 magnification of actual size. Although the resin is porous, it can be seen that there exists an essentially continuous skin covering the resin particle.

EXAMPLE VI

This Example is presented to show the novel resin of this invention produced by a preferred process and also the excellent properties of the resin. An 1100 gallon reactor equipped with agitation and cooling means was used in this Example. The following polymerization recipe was used:

| Ingredient | Parts by Weight |
| --- | --- |
| Vinyl chloride | 100 |
| Water (dimineralized) | 150 |
| Polyacrylic acid dispersant | 0.02 |
| PVA (55% hydrolysized) | 0.30 |
| NaOH | 0.0025 |
| Di(2-ethylhexyl)peroxydicarbonate | 0.045 |

The ingredients were charged according to the Reactor Charging Procedure disclosed in this specification except that the free radical catalyst (di(2-ethylhexyl)-peroxydicarbonate) was charged into the mixture of water and polyacrylic acid dispersant before monomer was charged. The PVA was charged into the vinyl monomer. The reaction was conducted at 53° C. The NaOH was charged as a 2% solution in water after 15 minutes into the reaction (about 1% conversion). At 350 minutes the reaction was shortstopped with the phenolic shortstop. The resin was removed from the reactor, stripped of residual monomer and dried to a free flowing powder.

The resin particles were skinless, agglomerated, irregular shaped porous resin particles. The resin had the following properties:

| | |
| --- | --- |
| Weight average particle size | 187 microns |
| Mercury porosity | 0.524 cc/gm |
| Powder mix time | 155 seconds |
| Friability | 0+ |

From the above results it can be seen that the resin has a high porosity and an exceptionally short powder mix time indicating that the skinless resin can very quickly absorb large amounts of plasticizer. The friability is also excellent, indicating that the resin particles will easily break apart when stress is applied thus resulting in low fish-eyes in the finished product. These excellent properties are obtained even though the reaction was run to 72% conversion.

EXAMPLE VII

This Example used the same 1100 gallon reactor and the charging procedure and polymerization recipe as Example VI, except that 0.005 part by weight of NaOH per 100 parts by weight monomer was used to desorb the primary dispersant.

The resin particles were skinless, agglomerated, irregular shaped porous resin particles with the following properties:

| | |
| --- | --- |
| Weight average particle size | 238 microns |
| Mercury Porosity | 0.466 cc/gm |
| Powder mix time | 173 |
| Friability | 0 |

The properties show a resin having excellent friability and fast powder mix times.

EXAMPLE VIII

This Example is presented to show the fast dry-up times and cycle times when this resin is mixed with high levels of polymeric plasticizer. The resin of Example VII is compared to a commercial resin produced by the process described in U.S. Pat. No. 3,706,722 to Nelson, et al and to a commercial high porosity (0.38) film grade resin having a skin. The resins were mixed in a Henschel mixer with 120 parts by weight of polymeric plasticizer per 100 parts by weight of resin. The following results were obtained:

| Resin | Dry-up Time | Cycle Time | Powder Flow Rating[2] |
| --- | --- | --- | --- |
| Nelson et al | 3 min. 38 sec.[1] | 15 min. 46 sec.[1] | 3[1] |
| Conventional high porosity film grade | 4 min. 4 sec. | 14 min 5 sec. | 4 |
| Example VII (this invention) | 2 min. 57 sec.[1] | 11 min. 51 sec.[1] | 3[1] |

[1] Average of 2 runs
[2] A powder flow rating of 3 indicates lumpy, free flowing. A powder flow rating of 4 indicates lumpy, wet.

EXAMPLE IX

This Example is presented to compare the level of fish-eyes in the resin of Example VI of this invention with the level of fish-eyes in the resin of Nelson, et al (U.S. Pat. No. 3,706,722).

| Test | Nelson et al Resin | | Example VI Resin (this invention) | |
| --- | --- | --- | --- | --- |
| 6 inch Mill Fish-eye | 4 | Fish-eye | 0 | Fish-eye |
| | 1 | Fines | 3 | Fines |
| | 5 | Total | 3 | Total |
| 8 inch Mill Fish-eye | 2 | Fish-eye | 0 | Fish-eye |
| | 1 | Fines | 0 | Fines |
| | 3 | Total | 0 | Total |

This Example demonstrates that the resin of this invention is excellent for low fish-eye. The resin of Nelson, et al has been recognized in the industry as being an excellent choice for low fish-eye. The resin of this invention is superior to the Nelson, et al resin for low fish-eye, thus indicating an excellent resin.

EXAMPLE X

This Example is presented to show an alternate method of producing low skin resins of this invention whereby low levels of the ion sensitive primary dispersants are used and NaOH is not used to desorb the primary dispersant. In this Example the following polymerization recipe and conditions were used:

| Ingredient | Parts by Weight |
| --- | --- |
| Vinyl chloride | 100 |
| Water (demineralized) | 150 |
| Polyacrylic acid dispersant | 0.025 |
| Low hydrolysis (55%) PVA | 0.600 |
| Di-secondary butyl peroxydicarbonate | 0.022 |
| Phenolic shortstop | 0.010 |

The reactor used and the charging procedure used were the same as in Example VI except that NaOH was not used to desorb the polyacrylic acid dispersant off the monomer droplets.

The resin produced was porous, low-skin, agglomerated and non-spherical and had the following properties:

| | |
| --- | --- |
| Weight average particle size | 313 microns |
| Mercury porosity | 0.428 cc/g |

| -continued | |
|---|---|
| Powder mix time | 246 seconds |

Figure 11:
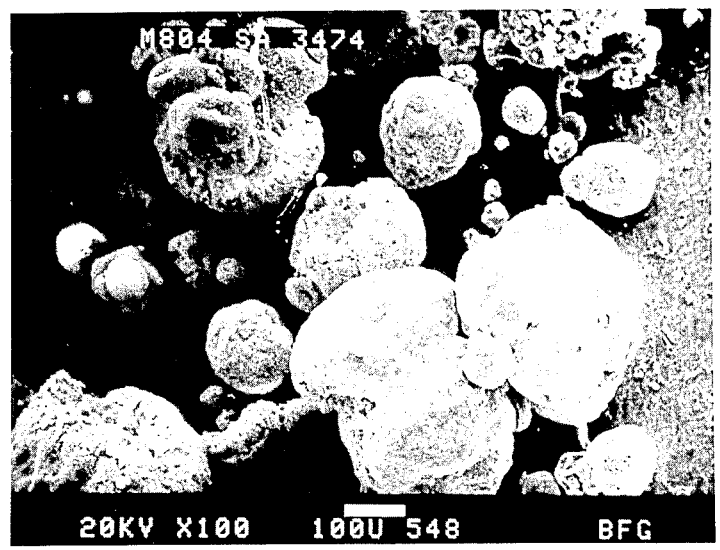
FIG. 11 is a photomicrograph of an agglomerated, non-spherical porous resin with low-skin magnified 100 times. The resin in FIG. 11 was produced in Example X.
Figure 12:
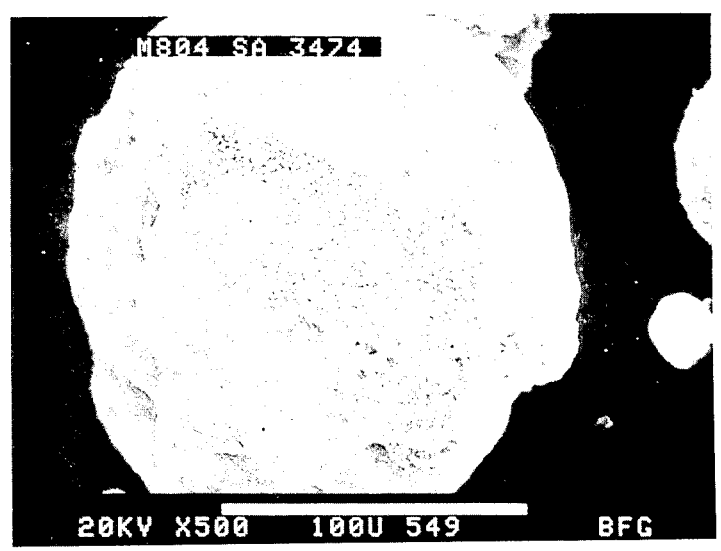
FIG. 12 is a photomicrograph of a resin particle in FIG. 11 magnified 500 times actual size.

From the microphotographs in FIGS. 11 and 12, it can be seen that the particles of this Example are non-spherical, agglomerated particles. FIG. 11 is a photomicrograph of the resin magnified 100 times actual size. FIG. 12 is a particle of FIG. 11 magnified to 500 times actual size. From FIG. 12 it can be seen that the particle has low-skin, that is, there are significantly large areas on the surface which have no skin and are sponge-like in appearance. There are also areas which have a skin on the surface of the particle. From FIG. 12 one can easily determine the difference in the degree of skin between this low-skin particle and the skinless particles of Examples I and II (FIGS. 2 and 5). The resin of this Example also exhibits equivalent friability and fish-eye levels to the Example VI resin.

EXAMPLE XI

This Example is presented to show an additional alternate method of producing the resins of this invention. In this Example a 55 liter reactor was used which was equipped with agitation and cooling means. The polymerization recipe used was as follows:

| | Parts by Weight | | |
|---|---|---|---|
| Ingredient | Run 1 | Run 2 | Run 3 |
| Vinyl chloride | 100 | 100 | 100 |
| Water (demineralized) | 150 | 150 | 150 |
| Sorbitan monooleate | 0.3 | 0.3 | 0.3 |
| PVA (55% hydrolyzed) | 0.3 | 0.2 | 0.1 |
| Polyacrylic acid dispersant | 0.0325 | 0.040 | 0.040 |
| Di-secondary butyl peroxydicarbonate | 0.030 | 0.030 | 0.030 |
| Phenolic shortstop | 0.010 | 0.010 | 0.010 |
| The resins were all skinless, agglomerated resins having the following properties: | | | |
| Weight average particle size (micron) | 145 | 186 | 232 |
| Mercury porosity (cc/g) | 0.503 | 0.420 | 0.397 |
| Powder mix time (seconds) | 163 | 204 | 177 |
| Friability value | 0 | 0+ | 1+ |

In all of the Examples which show the polymerization processes of this invention, the reactor buildup was from very low to none. This is in contrast to the process of Nelson, et al, which gives very high amounts of polymer buildup on the internal surfaces of the polymerization equipment. The very nature of the phase inversion process of Nelson, et al is believed to be detrimental to keeping the polymerization equipment clean. The process of this invention gives clean reactors which are able to be used for several polymerization runs before being shut down for cleaning.

The resins of this invention have many uses in end product applications where PVC is used. Their principal application is in film grade applications because of their high porosity and friability. Anywhere PVC resins are needed that require them to absorb a large amount of plasticizer quickly, the resins of this invention would be an excellent choice.

I claim:

1. An agitated aqueous suspension process for producing porous, substantially skinless, agglomerated polyvinyl chloride resin particles comprising polymerizing vinyl monomer in the presence of a dispersant system comprising (a) from about 0.02 to about 0.06 part by weight per 100 parts by weight monomer of an ion sensitive primary dispersant capable of thickening water; (b) from about 0.2 to about 0.4 part by weight of non-polyethylene oxide containing secondary dispersant; and (c) from about 0.1 to about 0.3 part by weight per 100 parts by weight vinyl monomer of a polyvinyl acetate secondary dispersant having a hydrolysis level less than 70%, said resin particles having a mercury porosity of from about 0.1 cc/g to about 0.7 cc/g, and a particle size of from about 70 microns to about 1000 microns, and a friability of less than about 2, and a powder mix time of less than about 400 seconds, and a shape factor less than about 0.85 and wherein greater than about 20% of the area of the surface of said particle is PVC as measured by ESCA.

2. A process of claim 1 wherein said non-polyethylene oxide containing dispersant is selected from the group consisting of sorbitan trioleate, sorbitan tristearate, sorbitan monooleate, sorbitan monopalmitate, glycerol monooleate, glycerol monostearate, and tri-glycerol monooleate.

3. A process of claim 2 wherein said primary dispersant is a lightly crosslinked interpolymer of acrylic acid.

4. A process of claim 3 wherein said polyvinyl acetate secondary dispersant has a hydrolysis level less than 55%.

5. A process of claim 4 wherein said vinyl monomer is vinyl chloride.

* * * * *